US010145254B2

(12) United States Patent
Takagi et al.

(10) Patent No.: US 10,145,254 B2
(45) Date of Patent: Dec. 4, 2018

(54) SEALING STRUCTURE AND TURBINE

(71) Applicant: Kabushiki Kaisha Toshiba, Minato-ku (JP)

(72) Inventors: Norikazu Takagi, Kawasaki (JP); Shogo Iwai, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 522 days.

(21) Appl. No.: 14/857,993

(22) Filed: Sep. 18, 2015

(65) Prior Publication Data

US 2016/0084098 A1 Mar. 24, 2016

(30) Foreign Application Priority Data

Sep. 19, 2014 (JP) ................................ 2014-190782

(51) Int. Cl.
*F01D 11/00* (2006.01)
*F01D 25/24* (2006.01)

(52) U.S. Cl.
CPC .......... *F01D 11/003* (2013.01); *F01D 11/005* (2013.01); *F01D 25/246* (2013.01); *F05D 2260/205* (2013.01)

(58) Field of Classification Search
CPC .... F01D 11/003; F01D 11/005; F01D 25/246; F05D 2260/205
USPC ...................................................... 415/170.1
See application file for complete search history.

(56) References Cited

U.S. PATENT DOCUMENTS

| 5,265,412 | A | * | 11/1993 | Bagepalli | ................ F01D 9/023 277/355 |
| 5,769,604 | A | * | 6/1998 | Gardner | ............... F16J 15/3412 277/306 |
| 8,800,300 | B2 | | 8/2014 | Hashimoto et al. | |
| 9,394,799 | B1 | * | 7/2016 | Mills | ........................ F16J 15/34 |

(Continued)

FOREIGN PATENT DOCUMENTS

DE 199 38 449 A1 2/2001
EP 2 246 530 A1 11/2010
(Continued)

OTHER PUBLICATIONS

Extended European Search Report dated Apr. 18, 2016 in Patent Application No. 15185865.1.
(Continued)

*Primary Examiner* — Aaron R Eastman
(74) *Attorney, Agent, or Firm* — Oblon, McClelland, Maier & Neustadt, L.L.P.

(57) ABSTRACT

A sealing structure according to the embodiment includes a first cylinder, a second cylinder, an intermediate cylinder, a first sealing part, and a second sealing part. The first cylinder forms a flow passage of a working fluid of a turbine therein. The second cylinder is disposed at one end of the first cylinder and downstream from the flow passage. The intermediate cylinder is disposed between the first and second cylinders. The first sealing part is disposed at one of a first region between the first cylinder and the intermediate cylinder and a second region between the second cylinder and the intermediate cylinder, and follows a positional displacement in a radial direction. The second sealing part is disposed at the other of the first and second regions, and follows a positional displacement in an axial direction.

10 Claims, 7 Drawing Sheets

(56) References Cited

U.S. PATENT DOCUMENTS

| | | | |
|---|---|---|---|
| 2010/0310360 A1* | 12/2010 | Speed | F01D 11/005 415/191 |
| 2011/0164965 A1 | 7/2011 | Smith et al. | |
| 2012/0251291 A1* | 10/2012 | Ledezma | F01D 5/082 415/1 |
| 2013/0259659 A1* | 10/2013 | Knaul | F16J 15/4472 415/170.1 |
| 2014/0311162 A1 | 10/2014 | Hashimoto et al. | |

FOREIGN PATENT DOCUMENTS

| | | |
|---|---|---|
| EP | 2 267 279 A1 | 12/2010 |
| EP | 2 351 910 A2 | 8/2011 |
| EP | 2 863 021 A1 | 4/2015 |
| JP | 2002-155703 A | 5/2002 |
| JP | 2009-203871 | 9/2009 |
| JP | 2010-285924 A | 12/2010 |
| JP | 2011-140945 | 7/2011 |
| JP | 2012-211616 | 11/2012 |
| JP | 2014-15927 A | 1/2014 |

OTHER PUBLICATIONS

Japanese Office Action dated Dec. 26, 2017 in Japanese Patent Application No. 2014-190782 (with unedited computer generated English translation), 9 pages.

* cited by examiner

SEALING STRUCTURE AND TURBINE

CROSS-REFERENCE TO RELATED APPLICATION

This application is based upon and claims the benefit of priority from Japanese Patent Application No. 2014-190782, filed on Sep. 19, 2014; the entire contents of which are incorporated herein by reference.

FIELD

Embodiments described herein relate generally to a sealing structure and a turbine.

BACKGROUND

In recent years, development of a $CO_2$ cycle power generation system in which carbon dioxide, fuel, and oxygen are introduced into a combustor, and power generation is performed by rotating a turbine by generated combustion gas has been advanced. According to the $CO_2$ cycle power generation system, it is possible to simultaneously perform the power generation and $CO_2$ recovery, and to perform high-efficiency power generation. Hereinafter, the turbine used for the $CO_2$ cycle power generation system is denoted as a $CO_2$ turbine.

In the $CO_2$ turbine, a temperature of the combustion gas being a working fluid is high, and a pressure difference between inside and outside of a casing is large. Therefore, it is impossible to sufficiently seal between adjacent members constituting the casing according to a conventional sealing structure. For example, in case of a steam turbine, the pressure difference between inside and outside of the casing is large such as approximately 30 MPa, but a temperature of the working fluid is low such as approximately 600° C. On the other hand, in case of a gas turbine, the temperature of the working fluid is high such as 1000° C. or more, but the pressure difference between inside and outside of the casing is low such as approximately 3 MPa. In case of the $CO_2$ turbine, the pressure difference between inside and outside of the casing is large such as approximately 30 MPa, and the temperature of the working fluid is high such as 1000° C. or more.

FIG. 10 is a sectional view illustrating an example of the $CO_2$ turbine in a vicinity of a final stage. A $CO_2$ turbine 100 includes a stationary component 111 and a rotary component 112. The stationary component 111 includes an inner casing 113 in a cylindrical shape and a not-illustrated outer casing.

A stationary blade cascade including a plurality of stationary blades 114 in a circumferential direction is disposed inside the casing 113. The stationary blade 114 includes an inside shroud 115, a stationary blade body 116, and an outside shroud 117 in this order from an inner side. An extension part 118 to prevent a heat input from the combustion gas to the casing 113 is further disposed at the stationary blade 114. Besides, a rotor blade cascade including a plurality of rotor blades 123 implanted to a rotor wheel 122 of a turbine rotor 121 at a constant interval in a circumferential direction is disposed at a direct downstream side of the stationary blade cascade. The stationary blade cascade and the rotor blade cascade are alternately provided along an axial direction. One turbine stage is made up of the stationary blade cascade and the rotor blade cascade at the direct downstream side of the stationary blade cascade. Note that in the drawing, a reference numeral 124 indicates a flow of the combustion gas. Besides, in the drawing, a reference numeral 125 indicates a flow of a cooling medium.

The casing 113 includes a first cylinder part 126 and a second cylinder part 127, for example, from an upstream side toward a downstream side of the flow of the combustion gas. Though it is not illustrated, the first cylinder part 126 is fixed at a part other than an end part at the second cylinder part 127 side. Besides, the second cylinder part 127 is fixed at a part other than an end part at the first cylinder part 126 side. A gap between the first cylinder part 126 and the second cylinder part 127 is sealed by a sealing part 128. An inner surface of the first cylinder part 126 is covered by the extension part 118, and the first cylinder part 126 is cooled by the cooling medium flowing between the first cylinder part 126 and the extension part 118.

The sealing part 128 includes, for example, a sealing member having a connection fin. As for the sealing member, a part except the connection fin is housed in an inside part of the second cylinder part 127, and the connection fin is in contact with an outer surface of the first cylinder part 126.

In case of the $CO_2$ turbine 100 having the above-stated structure, the cooling medium is in contact with the inner surface of the first cylinder part 126 and a temperature thereof becomes low. On the other hand, the combustion gas is in contact with an inner surface of the second cylinder part 127 and a temperature thereof becomes high.

When the temperature of the second cylinder part 127 becomes higher than the temperature of the first cylinder part 126, an elongation (thermal elongation) in a radial direction resulting from a thermal expansion of the second cylinder part 127 becomes large compared to a thermal elongation in the radial direction of the first cylinder part 126. A positional displacement in the radial direction occurs between the first cylinder part 126 and the second cylinder part 127 resulting from a difference in thermal elongations in the radial direction. Besides, as for the axial direction, a positional displacement in the axial direction occurs resulting from the thermal elongations in each direction of the first cylinder part 126 and the second cylinder part 127. In case of the illustrated sealing part 128, it is possible to follow the positional displacement in the axial direction, but it is impossible to enough follow the positional displacement in the radial direction.

Besides, one illustrated in FIG. 11 can be cited as the sealing part 128. The sealing part 128 illustrated in FIG. 11 includes a pair of groove parts disposed at inner surfaces of the first cylinder part 126 and the second cylinder part 127, and an annular sealing member housed in the pair of groove parts. The sealing part 128 as stated above is sealed by pressing the sealing member to side surfaces of the groove parts caused by a pressure difference between inside and outside of the casing 113. However, in case of the sealing part 128 as stated above, it is possible to follow the positional displacement in the radial direction, but it is impossible to enough follow the positional displacement in the axial direction.

Further, one illustrated in FIG. 12 can be cited as the sealing part 128. The sealing part 128 illustrated in FIG. 12 includes a thin plate state sealing member extending over an end face of the first cylinder part 126 and an end face of the second cylinder part 127. The sealing part 128 as stated above is able to follow positional displacements in the radial direction and the axial direction between the first cylinder part 126 and the second cylinder part 127 owing to an elastic deformation of the sealing member. However, when the pressure difference between inside and outside of the casing 113 becomes large, there is a possibility in which the sealing member is broken caused by shortage of strength. On the other hand, when the strength of the sealing member is increased, the elastic deformation is difficult to occur, and it is impossible to enough follow the positional displacements in the radial direction and the axial direction.

As stated above, when a gap between a pair of cylinder parts whose temperatures are different is sealed, it is necessary to follow positional displacements in both a radial direction and an axial direction.

An object of the present invention is to provide a sealing structure capable of sealing between a pair of cylinders whose temperatures are different.

DETAILED DESCRIPTION

A sealing structure according to the embodiment includes a first cylinder, a second cylinder, an intermediate cylinder, a first sealing part, and a second sealing part. The first cylinder forms a flow passage of a working fluid of a turbine therein. The second cylinder is disposed at one end of the first cylinder and downstream from the flow passage. The intermediate cylinder is disposed between the first and second cylinders. The first sealing part is disposed at one of a first region between the first cylinder and the intermediate cylinder and a second region between the second cylinder and the intermediate cylinder, and follows a positional displacement in a radial direction. The second sealing part is disposed at the other of the first and second regions, and follows a positional displacement in an axial direction.

Hereinafter, embodiments of the present invention are described in detail.

First Embodiment

Figure 1:
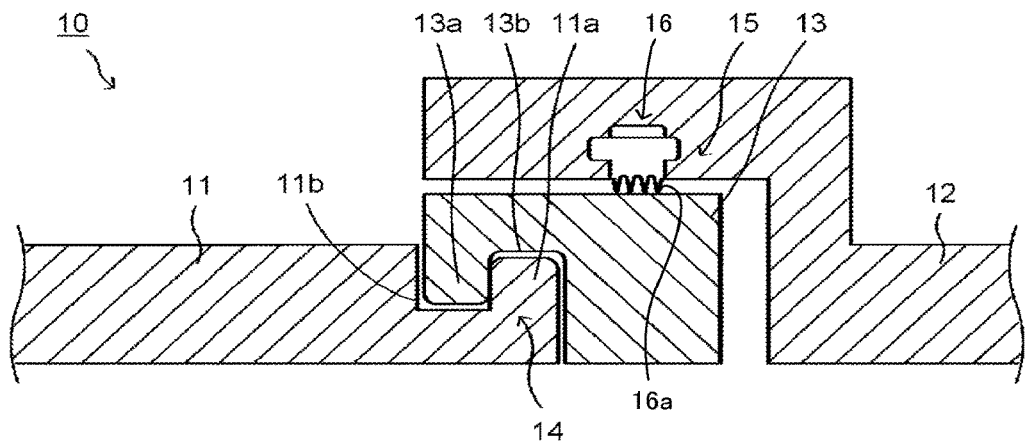
FIG. 1 is a sectional view of a sealing structure (before occurrence of thermal elongation) of a first embodiment.
Figure 2:
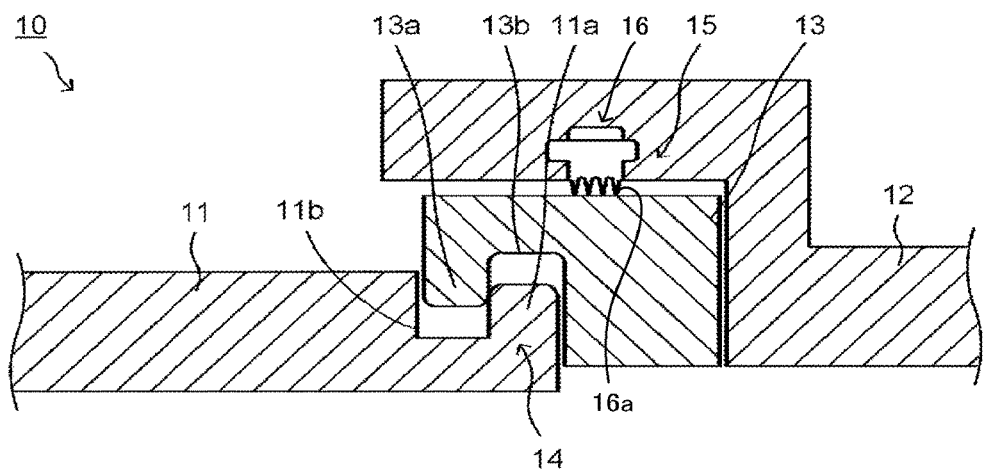
FIG. 2 is a sectional view of the sealing structure (after the occurrence of the thermal elongation) of the first embodiment.

FIG. 1 and FIG. 2 are sectional views each illustrating a sealing structure of a first embodiment.

FIG. 1 illustrates a state before occurrence of thermal elongation. FIG. 2 illustrates a state after the occurrence of the thermal elongation. Note that only a cross section at one radial direction side relative to a center axis is illustrated in each of FIG. 1 and FIG. 2.

A sealing structure 10 of the embodiment is suitably used when a temperature of a second cylinder part 12 is higher than a temperature of a first cylinder part 11.

The sealing structure 10 includes the first cylinder part 11, the second cylinder part 12, and an intermediate cylinder part 13. Center axes of the first cylinder part 11, the second cylinder part 12, and the intermediate cylinder part 13 are coincide. The second cylinder part 12 is disposed at one end part side in an axial direction of the first cylinder part 11. Though it is not illustrated, the first cylinder part 11 is fixed by a part except an end part at the second cylinder part 12 side. Besides, the second cylinder part 12 is fixed by a part except an end part at the first cylinder part 11 side.

The intermediate cylinder part 13 is disposed between the first cylinder part 11 and the second cylinder part 12 in a radial direction, and disposed between the first cylinder part 11 and the second cylinder part 12 in the axial direction. Besides, a first cylinder part 11 side of the intermediate cylinder part 13 is disposed at an outside of the end part of the first cylinder part 11, and a second cylinder part 12 side is disposed at an inside of the end part of the second cylinder part 12. Note that a temperature of the intermediate cylinder part 13 is set to be closer to a temperature of the second cylinder part 12 than a temperature of the first cylinder part 11. In particular, the temperature of the intermediate cylinder part 13 is preferably equal to the temperature of the second cylinder part 12.

A first sealing part 14 follows a positional displacement in the radial direction, and is disposed between the first cylinder part 11 and the intermediate cylinder part 13 (first region). Specifically, the first sealing part 14 is disposed at a part where the first cylinder part 11 and the intermediate cylinder part 13 are overlapped in the radial direction (first region).

The first sealing part 14 has a fitting structure. The fitting structure is made up of a fitting projecting part 11a and a fitting recessed part 11b disposed at the first cylinder part 11 and a fitting projecting part 13a and a fitting recessed part 13b disposed at the intermediate cylinder part 13.

The fitting projecting part 11a, the fitting recessed part 11b are disposed at the end part at the second cylinder part 12 side of the first cylinder part 11. The fitting projecting part 11a is disposed at the second cylinder part 12 side than the fitting recessed part 11b. The fitting projecting part 11a is disposed to be a projecting state toward outside, and the fitting recessed part 11b is disposed to be a recessed state toward inside.

The fitting projecting part 13a, the fitting recessed part 13b are disposed at the end part at the first cylinder part 11 side of the intermediate cylinder part 13. The fitting projecting part 13a is disposed at the first cylinder part 11 side than the fitting recessed part 13b. The fitting projecting part 13a is disposed to be a projecting state toward inside, and the fitting recessed part 13b is disposed to be a recessed state toward outside.

A surface of the fitting projecting part 11a at the fitting recessed part 11b side and a surface of the fitting projecting part 13a at the fitting recessed part 13b side are in contact with each other resulting from a pressure difference between inside and outside of a part made up of the first cylinder part 11, the second cylinder part 12, and the intermediate cylinder part 13. A gap between the first cylinder part 11 and the intermediate cylinder part 13 is sealed by the contact of a pair of surfaces. Besides, the pair of surfaces slide, and thereby, the positional displacement in the radial direction between the first cylinder part 11 and the intermediate cylinder part 13 is followed.

A second sealing part 15 follows a positional displacement in the axial direction, and is disposed between the second cylinder part 12 and the intermediate cylinder part 13 (second region). Specifically, it is disposed at a part where the second cylinder part 12 and the intermediate cylinder part 13 are overlapped in the radial direction (second region).

The second sealing part 15 includes a sealing member 16 having a contact fin 16a. A part except the contact fin 16a of the sealing member 16 is housed in an inner part of the second cylinder part 12, and the contact fin 16a is in contact with an outer surface of the intermediate cylinder part 13. The contact fin 16a is in contact with the intermediate cylinder part 13, and thereby, a gap between the second cylinder part 12 and the intermediate cylinder part 13 is sealed. Besides, the intermediate cylinder part 13 and the contact fin 16a slide, and thereby, the positional displacement in the axial direction between the second cylinder part 12 and the intermediate cylinder part 13 is followed.

When the temperature of the second cylinder part 12 becomes higher than the temperature of the first cylinder part 11, a thermal elongation of the second cylinder part 12 in the radial direction becomes large compared to a thermal elongation of the first cylinder part 11 in the radial direction, and a wall part of the second cylinder part 12 moves toward outside in the radial direction relative to a wall part of the first cylinder part 11 (FIG. 2).

At this time, when the temperature of the intermediate cylinder part 13 is closer to the temperature of the second cylinder part 12 than to the temperature of the first cylinder part 11, a wall part of the intermediate cylinder part 13 moves toward outside in the radial direction relative to the wall part of the first cylinder part 11 just like the second cylinder part 12. At this time, the first sealing part 14 which follows the positional displacement in the radial direction is disposed between the first cylinder part 11 and the intermediate cylinder part 13, and therefore, the gap between the first cylinder part 11 and the intermediate cylinder part 13 is effectively sealed.

Besides, the first cylinder part 11 and the second cylinder part 12 thermally elongate also in the axial direction, but it is effectively sealed by the second sealing part 15 which is disposed between the second cylinder part 12 and the intermediate cylinder part 13 and positionally displaces in the axial direction. In particular, moving amounts of the wall parts of the second cylinder part 12 and the intermediate cylinder part 13 toward outside in the radial direction are approximately equal, and the gap between the second cylinder part 12 and the intermediate cylinder part 13 is always kept constant, and therefore, it is effectively sealed by the second sealing part 15 which positionally displaces in the axial direction.

As described hereinabove, according to the sealing structure 10, the intermediate cylinder part 13 is held between the first cylinder part 11 and the second cylinder part 12, and thereby, the positional displacement between the first cylinder part 11 and the second cylinder part 12 can be divided into the positional displacement in the radial direction and the positional displacement in the axial direction. Accordingly, it is possible to effectively seal between the first cylinder part 11 and the second cylinder part 12 by the first sealing part 14 which follows the positional displacement in the radial direction and the second sealing part 15 which follows the positional displacement in the axial direction.

Besides, one cylinder part temperature of the first cylinder part 11 or the second cylinder part 12 is approximated to the temperature of the intermediate cylinder part 13, and thereby, the thermal elongations in the radial direction approximate, and the gap in the radial direction between these can be always kept constant. Accordingly, the gap between these can be effectively sealed by the second sealing part 15 which follows the positional displacement in the axial direction.

On the other hand, the gap between the other cylinder part of the first cylinder part 11 or the second cylinder part 12 and the intermediate cylinder part 13 in the radial direction becomes large, but the positional displacement in the axial direction does not occur between them, and therefore, it is effectively sealed by the first sealing part 14 which follows the positional displacement in the radial direction. Besides, the fitting structure is applied as the structure of the first sealing part 14, and thereby, it is possible to follow a large positional displacement.

Note that, in the first cylinder part 11, the second cylinder part 12, and the intermediate cylinder part 13, the temperature of the intermediate cylinder part 13 may be closer to the temperature of the first cylinder part 11 than to the temperature of the second cylinder part 12. When the temperature of the intermediate cylinder par 13 is closer to the temperature of the first cylinder part 11 than to the temperature of the second cylinder part 12, it is preferable that the second sealing part 15 which follows the positional displacement in the axial direction is disposed between the first cylinder part 11 and the intermediate cylinder part 13, and the first sealing part 14 which follows the positional displacement in the radial direction is disposed between the second cylinder part 12 and the intermediate cylinder part 13.

Second Embodiment

Figure 3:
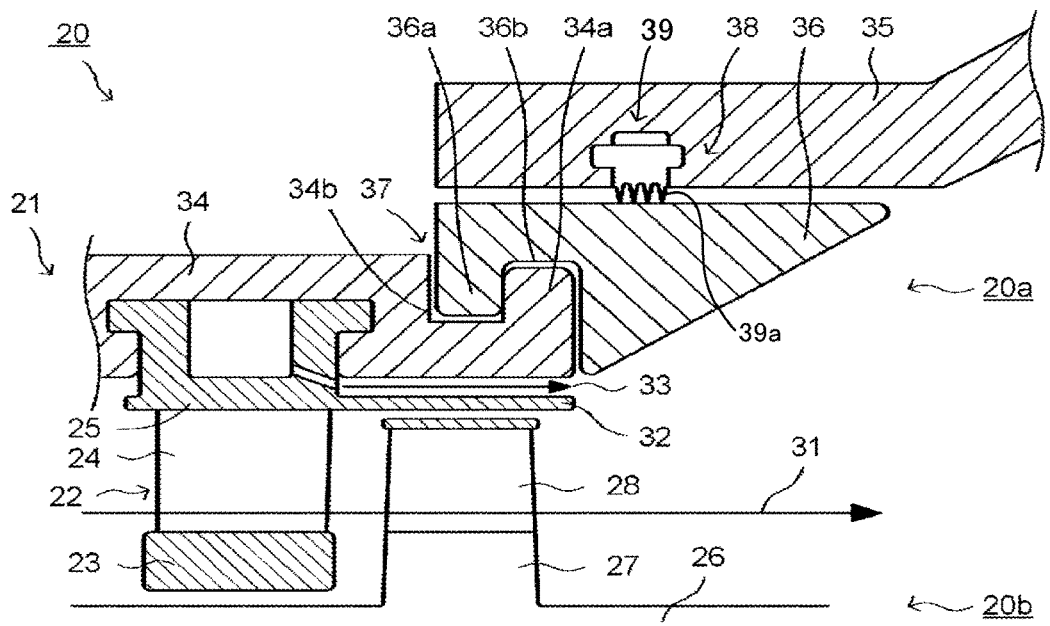
FIG. 3 is a sectional view illustrating a $CO_2$ turbine (before occurrence of thermal elongation) of a second embodiment.
Figure 4:
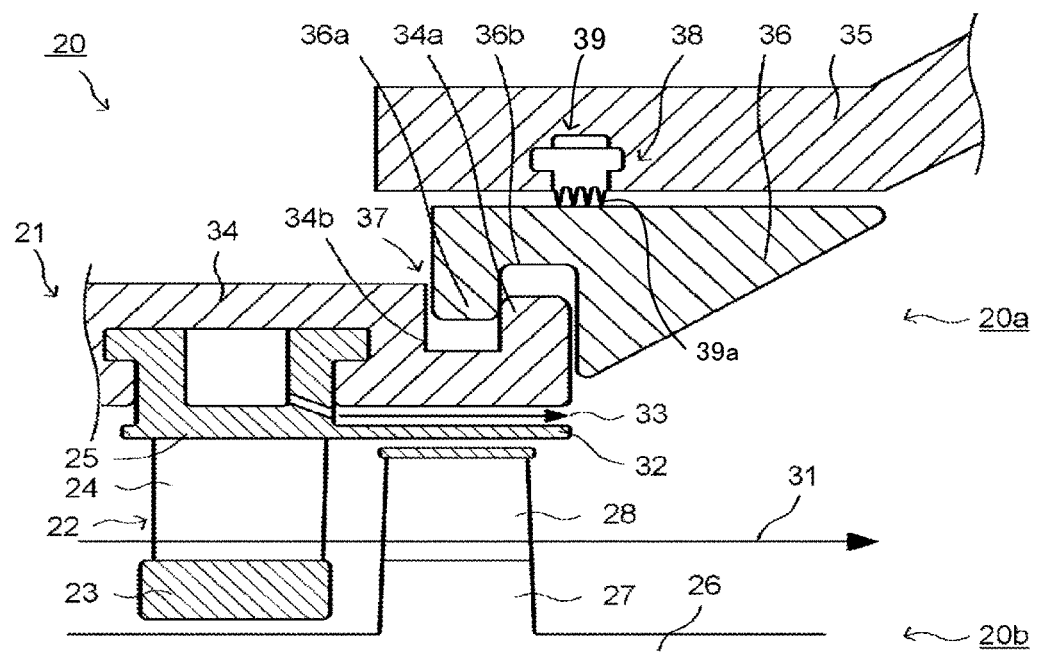
FIG. 4 is a sectional view illustrating the $CO_2$ turbine (after the occurrence of the thermal elongation) of the second embodiment.

FIG. 3 and FIG. 4 are sectional views each illustrating a $CO_2$ turbine 20 of a second embodiment. Note that FIG. 3 illustrates a state before occurrence of thermal elongation. FIG. 4 illustrates a state after the occurrence of the thermal elongation.

The $CO_2$ turbine 20 substantially has the sealing structure of the first embodiment. The $CO_2$ turbine 20 includes a stationary component 20a and a rotary component 20b. The stationary component 20a includes an inner casing 21 in a cylindrical shape and a not-illustrated outer casing. A stationary blade cascade having a plurality of stationary blades 22 in a circumferential direction is disposed inside the casing 21. The stationary blade 22 includes an inside shroud 23, a stationary blade body 24, and an outside shroud 25 in this order from an inner side. Besides, a rotor blade cascade including a plurality of rotor blades 28 implanted in a rotor wheel 27 of a turbine rotor 26 in a circumferential direction at a certain interval is disposed at a direct downstream side of the stationary blade cascade. The stationary blade cascade and the rotor blade cascade are alternately disposed along an axial direction. One turbine stage is made up of the stationary blade cascade and the rotor blade cascade at the direct downstream side.

A circular state combustion gas passage including the stationary blade cascade and the rotor blade cascade is disposed inside the casing 21. Combustion gas flows from a left side to a right side in the drawing as indicated by an arrow 31. An extension part 32 extending from the stationary blade 22 is disposed around the rotor blade 28. The extension part 32 is disposed to prevent a heat input from the combustion gas to the casing 21. Besides, a cooling medium flows from the left side to the right side in the drawing as indicated by an arrow 33 between the casing 21 and the extension part 32. For example, carbon dioxide being a supercritical fluid in a $CO_2$ cycle power generation system is used as the cooling medium. The cooling medium is introduced from an outside of the casing 21 to an inside of the outside shroud 25, and is further supplied between the casing 21 and the extension part 32 through a hole part disposed at the outer shroud 25.

The casing 21 includes a first cylinder part 34, a second cylinder part 35, an intermediate cylinder part 36, a first sealing part 37, and a second sealing part 38. The first cylinder part 34, the second cylinder part 35 form a flow passage of the combustion gas, and the second cylinder part 35 is disposed at a downstream side of the first cylinder part 34. The first sealing part 37 is disposed between the first cylinder part 34 and the intermediate cylinder part 36, and has the fitting structure. The second sealing part 38 is disposed between the second cylinder part 35 and the intermediate cylinder part 36, and does not have the fitting structure.

The first cylinder part 34 includes a fitting projecting part 34*a* and a fitting recessed part 34*b* at an end part at the second cylinder part 35 side. The fitting projecting part 34*a* is disposed at the second cylinder part 35 side than the fitting recessed part 34*b*. The fitting projecting part 34*a* is disposed to be a projecting state toward outside, and the fitting recessed part 34*b* is disposed to be a recessed state toward inside.

The second cylinder part 35 is disposed such that an end part at the first cylinder part 34 side covers the end part of the first cylinder part 34 at the second cylinder part 35 side from outside.

In the intermediate cylinder part 36, one end part side is disposed between the first cylinder part 34 and the second cylinder part 35 in a radial direction, and the other end part side is disposed to cover an end face of the first cylinder part 34 at the second cylinder part 35 side.

The intermediate cylinder part 36 includes a fitting projecting part 36*a* and a fitting recessed part 36*b* at the first cylinder part 34 side. The fitting projecting part 36*a* is disposed at the first cylinder part 34 side than the fitting recessed part 36*b*. The fitting projecting part 36*a* is disposed to be a projecting state toward inside, and the fitting recessed part 36*b* is disposed to be a recessed state toward outside.

An outside diameter of the intermediate cylinder part 36 is constant in the axial direction. Besides, an inside diameter of the intermediate cylinder part 36 at the first cylinder part 34 side is approximately the same as the first cylinder part 34, then it gradually expands toward an opposite side to be able to be in contact with the combustion gas as for a part except the fitting projecting part 36*a* and the fitting recessed part 36*b*.

The first sealing part 37 has the fitting structure made up of the fitting projecting part 34*a* and the fitting recessed part 34*b* disposed at the first cylinder part 34, and the fitting projecting part 36*a* and the fitting recessed part 36*b* disposed at the intermediate cylinder part 36. The second sealing part 38 includes a sealing member 39 which has a contact fin 39*a* housed in an inner part of the second cylinder part 35.

The extension part 32 is disposed up to the end part of the first cylinder part 34 at the second cylinder part 35 side, does not cover an inner surface of the intermediate cylinder part 36, and covers an inner surface of the first cylinder part 34. The first cylinder part 34 is thereby in contact with the cooling medium without being in contact with the combustion gas, and the second cylinder part 35 and the intermediate cylinder part 36 are in contact with the combustion gas without being in contact with the cooling medium.

Here, a flow rate of the cooling medium is extremely small compared to a flow rate of the combustion gas. Besides, the cooling medium is mixed with the combustion gas at the same time when it flows from between the first cylinder part 34 and the extension part 32. The cooling medium no longer exists as the cooling medium at the time when it flows from between the first cylinder part 34 and the extension part 32 because of a reason as stated above. Accordingly, the second cylinder part 35 and the intermediate cylinder part 36 are substantially in contact with only the combustion gas.

When the combustion gas is brought into contact with the second cylinder part 35 and the intermediate cylinder part 36, temperatures of the second cylinder part 35 and the intermediate cylinder part 36 become approximately equal. Accordingly, thermal elongations in the radial direction of the second cylinder part 35 and the intermediate cylinder part 36 become approximately the same degree, and wall parts of the intermediate cylinder part 36 and the second cylinder part 35 move toward outside in the radial direction relative to a wall part of the first cylinder part 34 (FIG. 4).

The first sealing part 37 which follows a positional displacement in the radial direction is disposed between the first cylinder part 34 and the intermediate cylinder part 36 (first region). Therefore, a gap between the first cylinder part 34 and the intermediate cylinder part 36 is sealed by the first sealing part 37.

On the other hand, the first cylinder part 34 and the second cylinder part 35 thermally elongate also in the axial direction, but they are effectively sealed by the second sealing part 38 which is disposed between the second cylinder part 35 and the intermediate cylinder part 36 (second region) and positionally displaces in the axial direction. In particular, a moving amount of the wall part of the second cylinder part 35 toward outside in the radial direction and a moving amount of the wall part of the intermediate cylinder part 36 toward outside in the radial direction are approximately equal, and a gap between the second cylinder part 35 and the intermediate cylinder part 36 is always kept constant, and therefore, it is effectively sealed by the second sealing part 38 which positionally displaces in the axial direction.

It is preferable to make composing materials of the second cylinder part 35 and the intermediate cylinder part 36 the same from a viewpoint of making the thermal elongations of the second cylinder part 35 and the intermediate cylinder part 36 in the radial direction approximately equal. As the composing material of the second cylinder part 35 and the intermediate cylinder part 36, a nickel group alloy excellent in heat resistance is preferable. On the other hand, as a composing material of the first cylinder part 34, the heat resistance is not necessarily required, and an iron group alloy is preferable from a viewpoint of a manufacturing cost.

Figure 5:
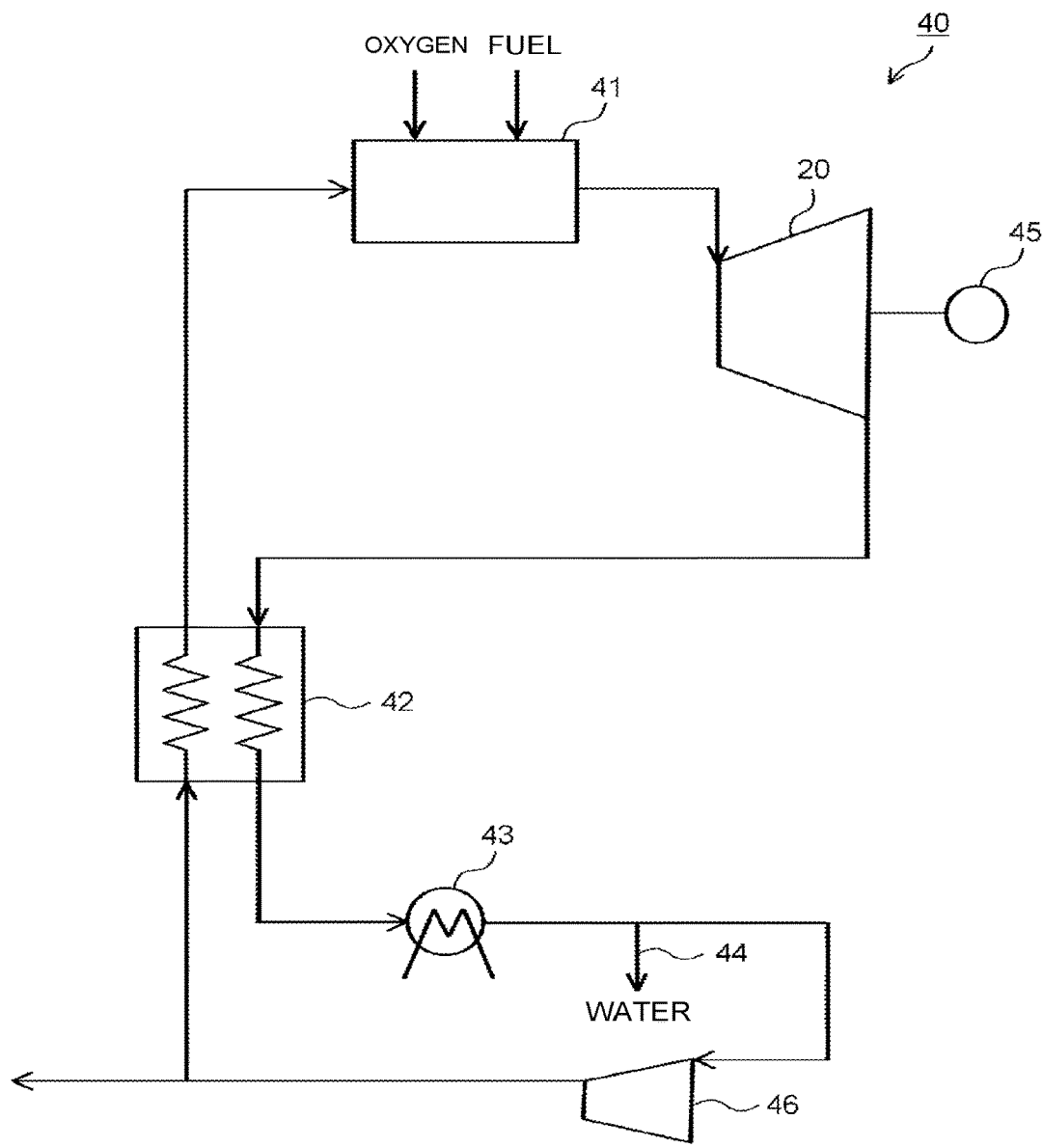
FIG. 5 is a system diagram of a gas turbine facility of the second embodiment.

FIG. 5 is a system diagram of a gas turbine facility 40 where the $CO_2$ turbine 20 is applied. The gas turbine facility 40 is used for, for example, a $CO_2$ cycle power generation system.

Oxygen and fuel are supplied to a combustor 41 to be burned. Besides, carbon dioxide generated at the combustor 41 before this combustion is supplied to the combustor 41. Carbon dioxide is, for example, mixed with oxygen to be used for the combustion. Flow rates of the fuel and oxygen are adjusted to be, for example, a stoichiometric mixture ratio (theoretical mixture ratio) under a state in which they are completely mixed. For example, natural gas, hydrocarbon such as methane, coal gasification gas, and so on are used as the fuel.

Combustion gas (working fluid) made up of carbon dioxide and water vapor discharged from the combustor 41 is introduced into the $CO_2$ turbine 20. The combustion gas which performs an expansion work at the $CO_2$ turbine 20 passes through a first heat exchanger 42, and further passes through a second heat exchanger 43. When it passes through the second heat exchanger 43, the water vapor is condensed into water. The water is discharged outside through a pipe 44. Note that a power generator 45 is coupled to the $CO_2$ turbine 20.

The carbon dioxide from which water vapor is separated is pressurized by a compressor 46 to be a supercritical fluid. A part of the pressurized carbon dioxide is heated at the first heat exchanger 42 to be supplied to the combustor 41. The carbon dioxide supplied to the combustor 41 is ejected at a combustion area together with the fuel and oxidant from, for example, an upstream side of the combustor 41.

When the $CO_2$ turbine 20 is cooled, a pipe which branches from middle of a flow passage at the first heat exchanger 42 to be connected to the $CO_2$ turbine 20 is disposed. A part of the carbon dioxide being the supercritical fluid is introduced into the $CO_2$ turbine 20 as the cooling medium through this pipe.

The rest of the pressurized carbon dioxide is discharged outside the system. The carbon dioxide discharged outside is recovered by, for example, a recovery system. Besides, the carbon dioxide discharged outside can be also used for an EOR (enhanced oil recovery) used at, for example, an oil drilling field. In the above-stated system, the carbon dioxide at an amount corresponding to, for example, a generation amount of the carbon dioxide generated by combusting the fuel and oxygen at the combustor 41 is discharged outside of the system.

Third Embodiment

Figure 6:
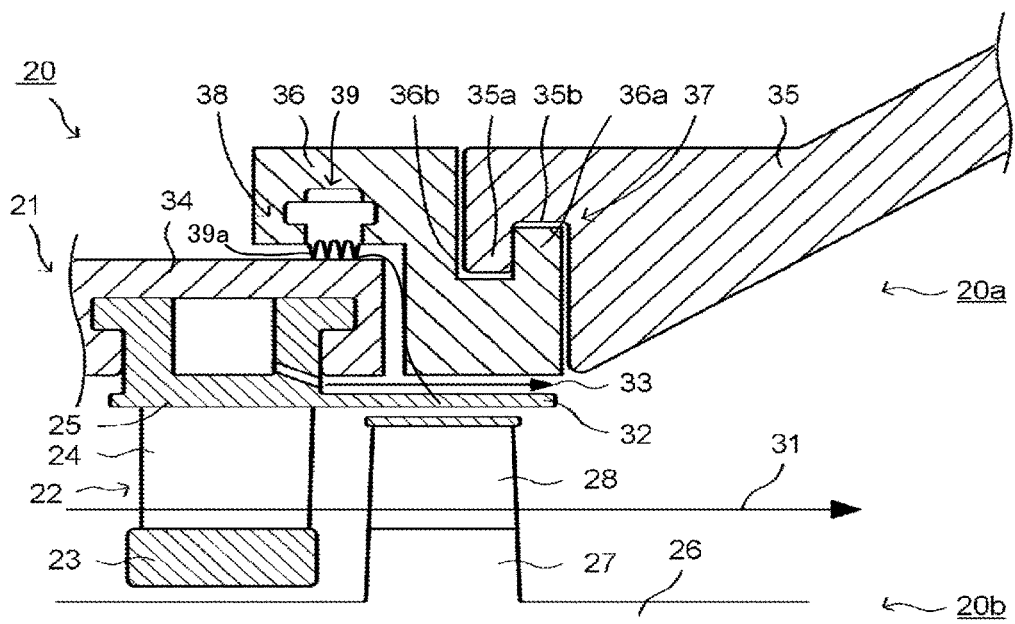
FIG. 6 is a sectional view illustrating a $CO_2$ turbine (before occurrence of thermal elongation) of a third embodiment.
Figure 7:
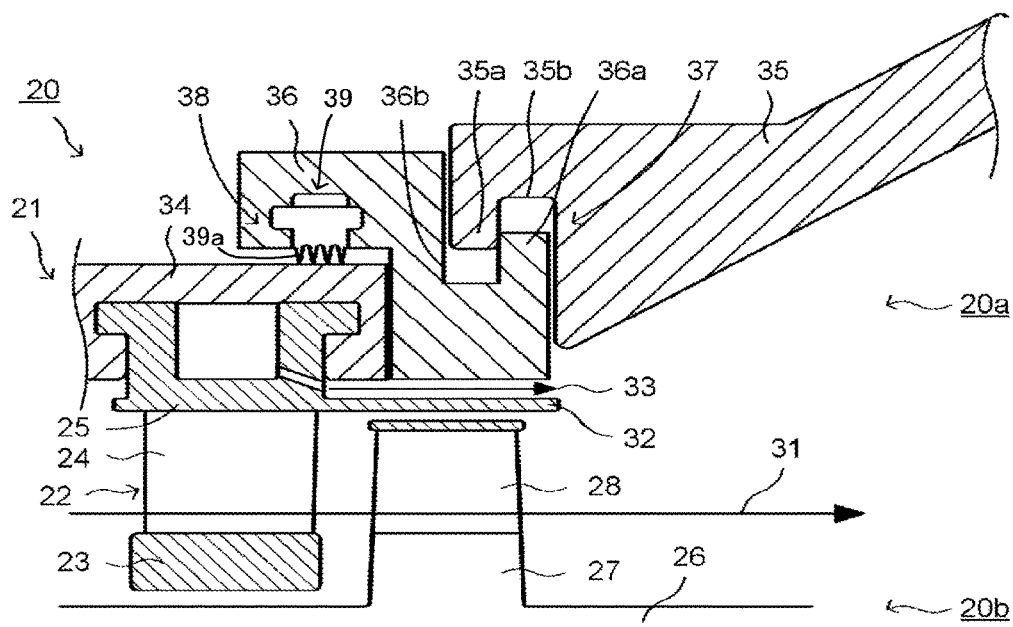
FIG. 7 is a sectional view illustrating the $CO_2$ turbine (after the occurrence of the thermal elongation) of the third embodiment.

FIG. 6, FIG. 7 are sectional views each illustrating the $CO_2$ turbine 20 according to a third embodiment. FIG. 6 illustrates a state before occurrence of thermal elongation. FIG. 7 illustrates a state after the occurrence of the thermal elongation. Note that the $CO_2$ turbine 20 of the embodiment has a structure similar to the $CO_2$ turbine 20 of the second embodiment except a part of the casing 21.

The casing 21 includes the first cylinder part 34, the second cylinder part 35, the intermediate cylinder part 36, the first sealing part 37, and the second sealing part 38. The first sealing part 37 is disposed between the second cylinder part 35 and the intermediate cylinder part 36 (second region), and has the fitting structure. The second sealing part 38 is disposed between the first cylinder part 34 and the intermediate cylinder part 36 (first region), and does not have the fitting structure.

The first cylinder part 34 has a constant outside diameter in the axial direction. The second cylinder part 35 is disposed with an interval in the axial direction relative to the first cylinder part 34. The second cylinder part 35 includes a fitting projecting part 35a and a fitting recessed part 35b at the end part at the first cylinder part 34 side. The fitting projecting part 35a is disposed at the first cylinder part 34 side than the fitting recessed part 35b. The fitting projecting part 35a is disposed to be a projected state toward inside, and the fitting recessed part 35b is disposed to be a recessed state toward outside.

As for a part of the second cylinder part 35 except the fitting projecting part 35a and the fitting recessed part 35b, an inside diameter at the first cylinder part 34 side is similar to an inside diameter of the first cylinder part 34, and the inside diameter gradually expands toward an opposite side of the first cylinder part 34.

The intermediate cylinder part 36 is disposed such that the first cylinder part 34 side positions outside the first cylinder part 34, and the second cylinder part 35 side positions inside the second cylinder part 35. The intermediate cylinder part 36 includes the fitting projecting part 36a and the fitting recessed part 36b at the second cylinder part 35 side. The fitting projecting part 36a is disposed at the second cylinder part 35 side than the fitting recessed part 36b. The fitting projecting part 36a is disposed to be a projected state toward outside, and the fitting recessed part 36b is disposed to be a recessed state toward inside. The inside diameter of the intermediate cylinder part 36 at a part disposed between the first cylinder part 34 and the second cylinder part 35 in the axial direction is similar to the inside diameter of the first cylinder part 34.

The first sealing part 37 has the fitting structure made up of the fitting projecting part 35a and the fitting recessed part 35b disposed at the second cylinder part 35 and the fitting projecting part 36a and the fitting recessed part 36b disposed at the intermediate cylinder part 36. The second sealing part 38 includes the sealing member 39 having the contact fin 39a housed in an inner part of the intermediate cylinder part 36.

In the casing 21 of the embodiment, the extension part 32 is disposed to cover both inner surfaces of the first cylinder part 34 and the intermediate cylinder part 36. Besides, an end face of the intermediate cylinder part 36 at the second cylinder part 35 side is disposed vertically relative to the axial direction so as not to be in contact with the combustion gas.

When the cooling medium is in contact with the first cylinder part 34 and the intermediate cylinder part 36, temperatures of the first cylinder part 34 and the intermediate cylinder part 36 become approximately equal. Accordingly, thermal elongations in the radial direction of the first cylinder part 34 and the intermediate cylinder part 36 become approximately equal, and the wall part of the second cylinder part 35 moves toward outside in the radial direction relative to the wall parts of the first cylinder part 34 and the intermediate cylinder part 36 (FIG. 7).

The first sealing part 37 which follows the positional displacement in the radial direction is disposed between the second cylinder part 35 and the intermediate cylinder part 36. Therefore, the gap between the second cylinder part 35 and the intermediate cylinder part 36 is sealed by the first sealing part 37.

On the other hand, the first cylinder part 34 and the second cylinder part 35 thermally elongate also in the axial direction, but it is effectively sealed by the second sealing part 38 which is disposed between the first cylinder part 34 and the intermediate cylinder part 36 and positionally displaces in the axial direction. In particular, a moving amount of the wall part of the first cylinder part 34 toward outside in the radial direction and a moving amount of the wall part of the intermediate cylinder part 36 toward outside in the radial direction are approximately equal, and a gap between the first cylinder part 34 and the intermediate cylinder part 36 is always kept constant, and therefore, it is effectively sealed by the second sealing part 38 which positionally displaces in the axial direction.

It is preferable to make the composing materials of the first cylinder part 34 and the intermediate cylinder part 36 the same from the viewpoint of making the thermal elongations in the radial direction of the first cylinder part 34 and the intermediate cylinder part 36 approximately equal. As the composing material of the first cylinder part 34 and the intermediate cylinder part 36, the heat resistance is not necessarily required, and the iron group alloy is preferable from the viewpoint of the manufacturing cost. On the other hand, as the composing material of the second cylinder part 35, the nickel group alloy excellent in the heat resistance is preferable.

Fourth Embodiment

Figure 8:
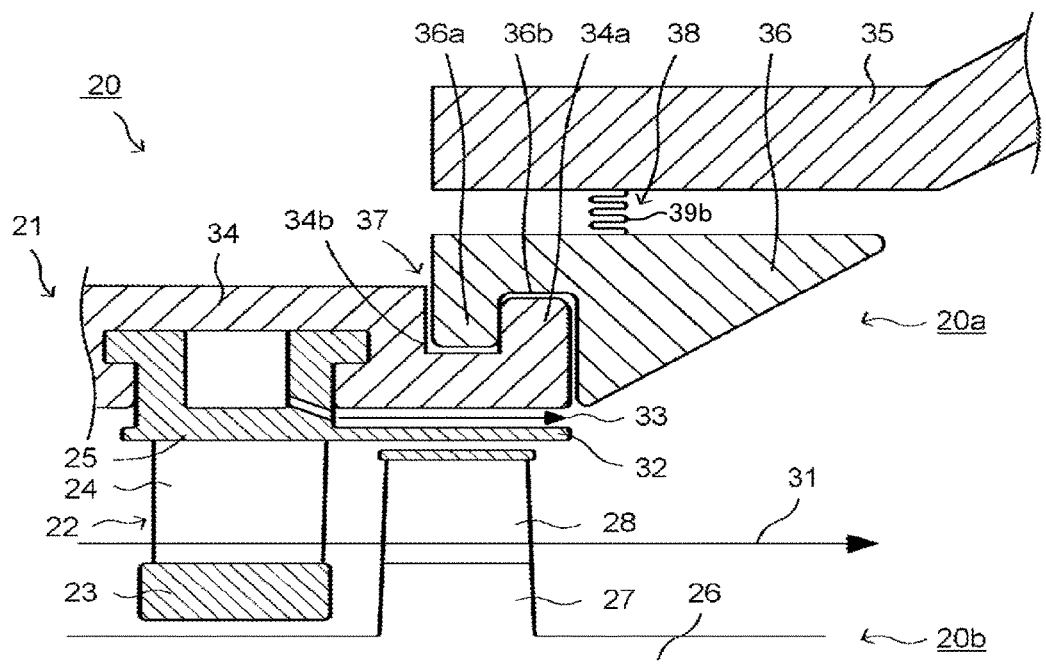
FIG. 8 is a sectional view illustrating a $CO_2$ turbine (before occurrence of thermal elongation) of a fourth embodiment.

FIG. 8 is a sectional view illustrating the $CO_2$ turbine 20 according to a fourth embodiment. Note that FIG. 8 illustrates a state before occurrence of thermal elongation.

The $CO_2$ turbine 20 of the embodiment has a structure similar to the $CO_2$ turbine 20 of the second embodiment except the second sealing part 38. In the $CO_2$ turbine 20 of the embodiment, the second sealing part 38 includes a bellows 39b. According to the bellows 39b, it is possible to follow the positional displacements in the axial direction and the radial direction between the second cylinder part 35 and the intermediate cylinder part 36. Besides, the bellows 39b is disposed between the second cylinder part 35 and the intermediate cylinder part 36, and thereby, it is possible to suppress that the combustion gas is directly in contact with the bellows 39b, and to suppress damages of the bellows 39b. As for the bellows 39b, for example, an outer edge is fixed to an inner surface of the second cylinder part 35, and an inner edge is fixed to an outer surface of the intermediate cylinder part 36.

Fifth Embodiment

Figure 9:
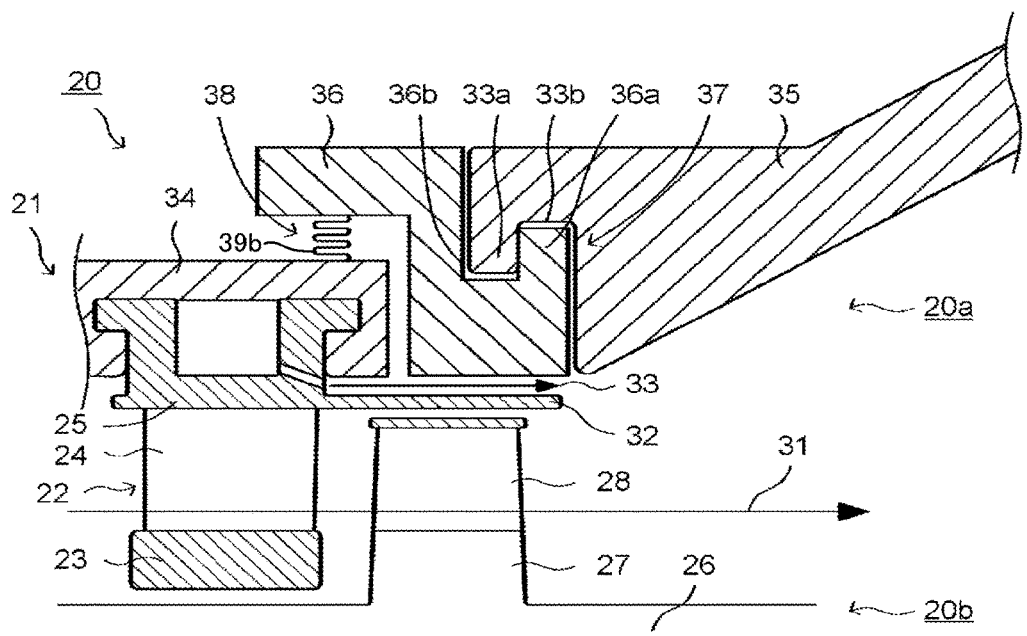
FIG. 9 is a sectional view illustrating a $CO_2$ turbine (before occurrence of thermal elongation) of a fifth embodiment.
Figure 10:
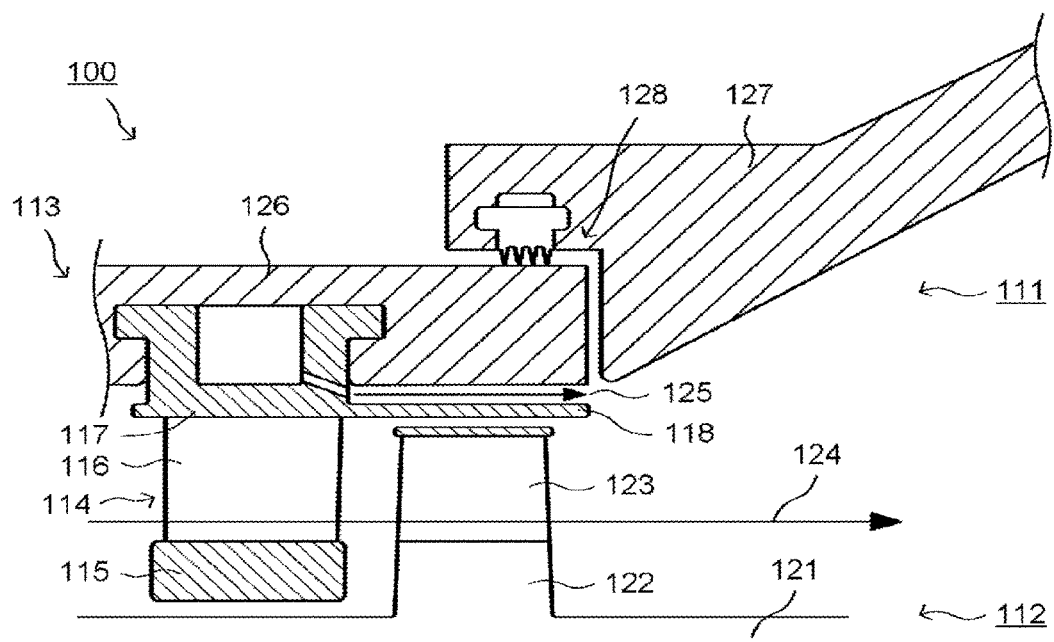
FIG. 10 is a sectional view illustrating a first example of a $CO_2$ turbine where a conventional sealing part is applied.
Figure 11:
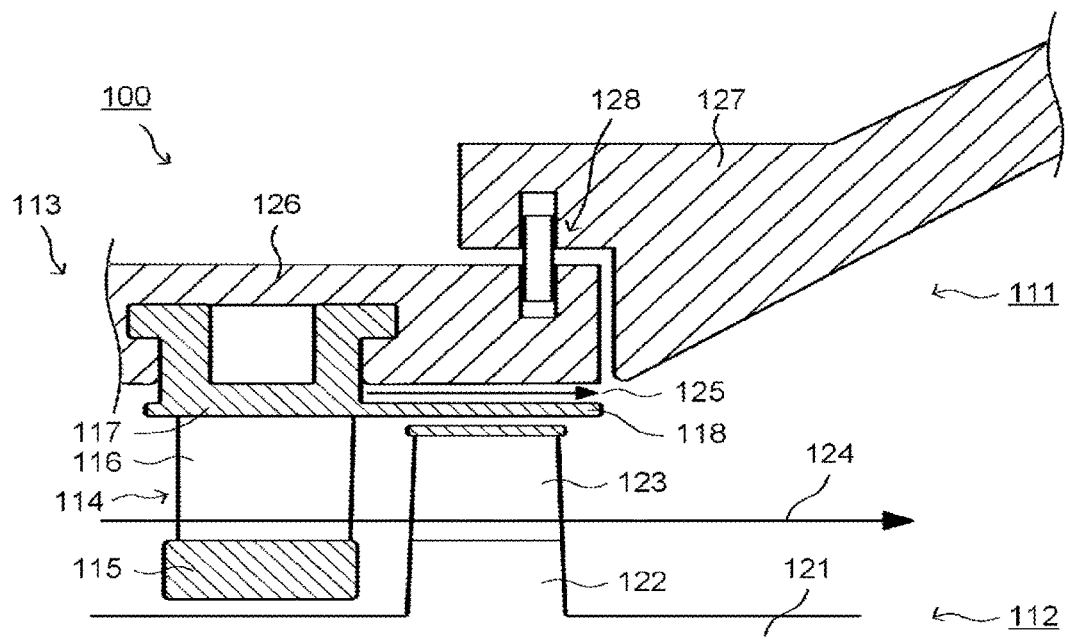
FIG. 11 is a sectional view illustrating a second example of the $CO_2$ turbine where the conventional sealing part is applied.
Figure 12:
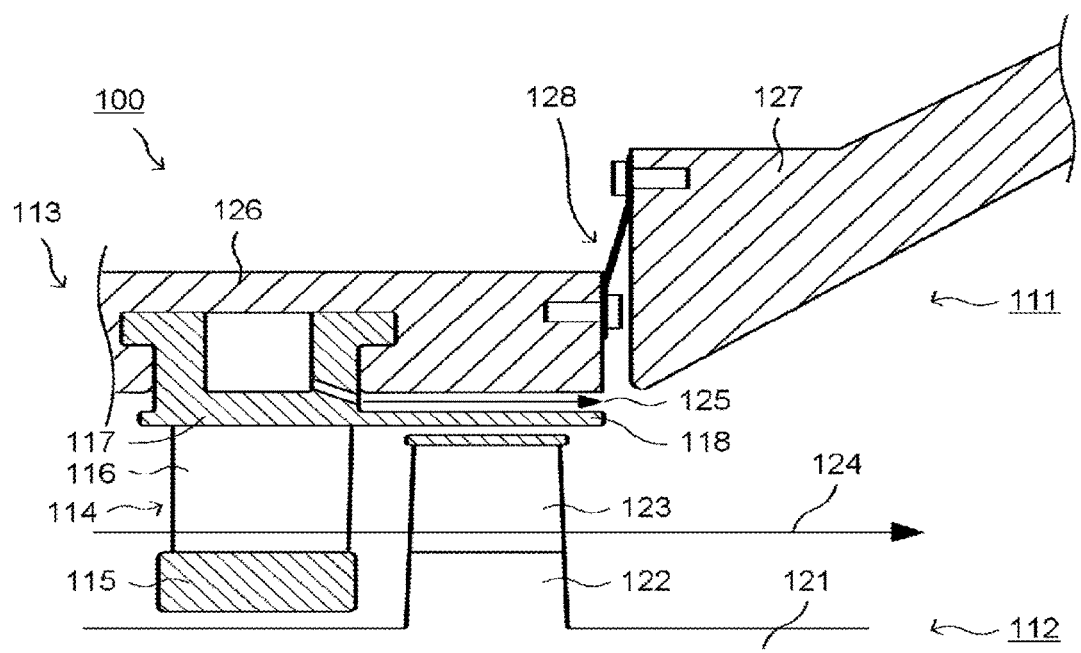
FIG. 12 is a sectional view illustrating a third example of the $CO_2$ turbine where the conventional sealing part is applied.

FIG. 9 is a sectional view illustrating a fifth embodiment of the $CO_2$ turbine 20. Note that FIG. 9 illustrates a state before occurrence of thermal elongation.

The $CO_2$ turbine 20 of the embodiment has a structure similar to the $CO_2$ turbine 20 of the third embodiment except the second sealing part 38. In the $CO_2$ turbine 20 of the embodiment, the second sealing part 38 includes the bellows 39b. According to the bellows 39b, it is possible to follow the positional displacements in the axial direction and the radial direction between the first cylinder part 34 and the intermediate cylinder part 36. Besides, the bellows 39b is disposed between the first cylinder part 34 and the intermediate cylinder part 36, and thereby, it is possible to suppress that the combustion gas is directly in contact with the bellows 39b, and to suppress the damages of the bellows 39b. As for the bellows 39b, for example, the outer edge is fixed to the inner surface of the intermediate cylinder part 36, and the inner edge is fixed to an outer surface of the first cylinder part 34.

Hereinabove, the $CO_2$ turbine where the sealing structure is applied is described, but a turbine where the sealing structure is applied is not limited to the $CO_2$ turbine. As the turbine where the sealing structure is applied, it may be a publicly known steam turbine or gas turbine. As the turbine where the sealing structure is applied, a cooling turbine is preferable where a positional displacement is easy to occur between members because a cooling structure is held, and as the cooling turbine, there can be cited the gas turbine or the $CO_2$ turbine, and in particular, the $CO_2$ turbine is preferable. Note that the sealing structure is not limited to be applied to the turbine, but it may be applied to other devices or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A turbine comprising:
   a sealing structure including:
   a first cylinder forming a flow passage of a working fluid of the turbine therein;
   a second cylinder disposed at one end of the first cylinder and downstream from the flow passage;
   an intermediate cylinder disposed between the first and second cylinders;
   a first seal disposed at a first region between the first cylinder and the intermediate cylinder and configured to follow a positional displacement in a radial direction; and
   a second seal disposed at a second region between the second cylinder and the intermediate cylinder and configured to follow a positional displacement in an axial direction,
   a stationary blade disposed in the first cylinder,
   a rotor blade provided at a direct downstream side of the stationary blade, and
   a barrier provided between the first cylinder and a tip of the rotor blade, the barrier immediately radially adjacent an inner surface of the first cylinder and not immediately radially adjacent an inner surface of the intermediate cylinder, the barrier forming a gap with the inner surface of the first cylinder, the gap functioning as a flow passage of a cooling medium having a temperature lower than that of the working fluid, the first cylinder being in contact with the cooling medium without being in contact with the working fluid, and the second cylinder and the intermediate cylinder being in contact with the working fluid without being in contact with the cooling medium.

2. The turbine according to claim 1, wherein the first seal includes a fitting.

3. The turbine according to claim 1, wherein the second seal includes a contact fin.

4. The turbine according to claim 1, wherein the second seal includes a bellows.

5. The turbine according to claim 1, wherein a temperature of the intermediate cylinder is closer to a temperature of the second cylinder than to a temperature of the first cylinder.

6. A turbine comprising:
a sealing structure including:
- a first cylinder forming a flow passage of a working fluid of the turbine therein;
- a second cylinder disposed at one end of the first cylinder and downstream from the flow passage;
- an intermediate cylinder disposed between the first and second cylinders;
- a first seal disposed at a second region between the second cylinder and the intermediate cylinder and configured to follow a positional displacement in a radial direction; and
- a second seal disposed at a first region between the first cylinder and the intermediate cylinder and configured to follow a positional displacement in an axial direction, a stationary blade disposed in the first cylinder,
a rotor blade provided at a direct downstream side of the stationary blade, and
a barrier provided between the first cylinder and a tip of the rotor blade, the barrier immediately radially adjacent an inner surface of each of the first cylinder and the intermediate cylinder, the barrier forming a gap with the inner surface of each of the first cylinder and the intermediate cylinder, the gap functioning as a flow passage of a cooling medium having a temperature lower than that of the working fluid, the first cylinder and the intermediate cylinder being in contact with the cooling medium without being in contact with the working fluid, and the second cylinder being in contact with the working fluid without being in contact with the cooling medium.

7. The turbine according to claim 6, wherein the first seal includes a fitting.

8. The turbine according to claim 6, wherein the second seal includes a contact fin.

9. The turbine according to claim 6, wherein the second seal includes a bellows.

10. The turbine according to claim 6, wherein a temperature of the intermediate cylinder is closer to a temperature of the second cylinder than to a temperature of the first cylinder.

* * * * *